Jan. 15, 1952     J. Y. BLAZEK     2,582,524
REAMER AND METHOD OF PRODUCING SAME
Filed Dec. 15, 1945     2 SHEETS—SHEET 1
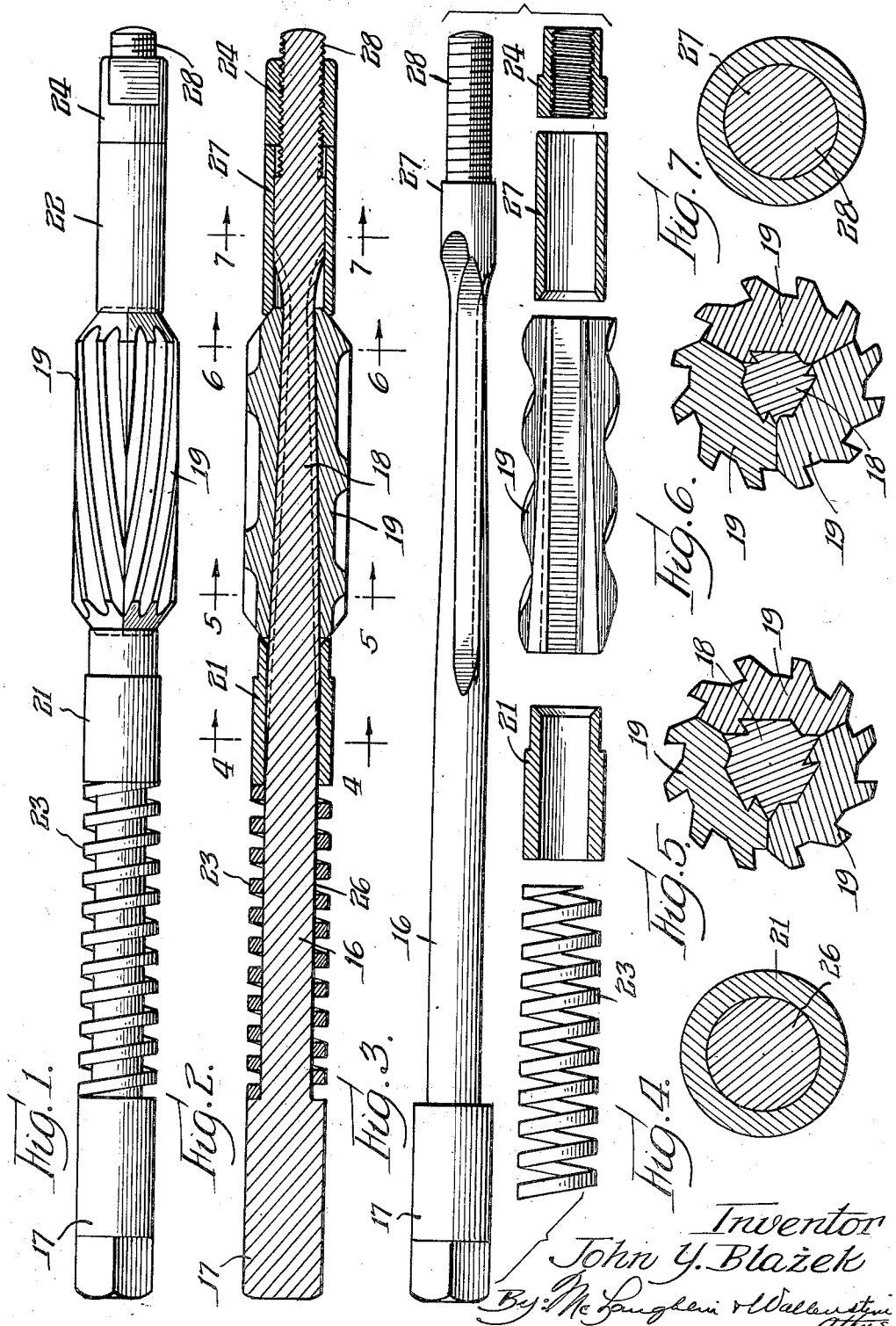
Inventor
John Y. Blazek Jan. 15, 1952   J. Y. BLAZEK   2,582,524
REAMER AND METHOD OF PRODUCING SAME
Filed Dec. 15, 1945   2 SHEETS—SHEET 2
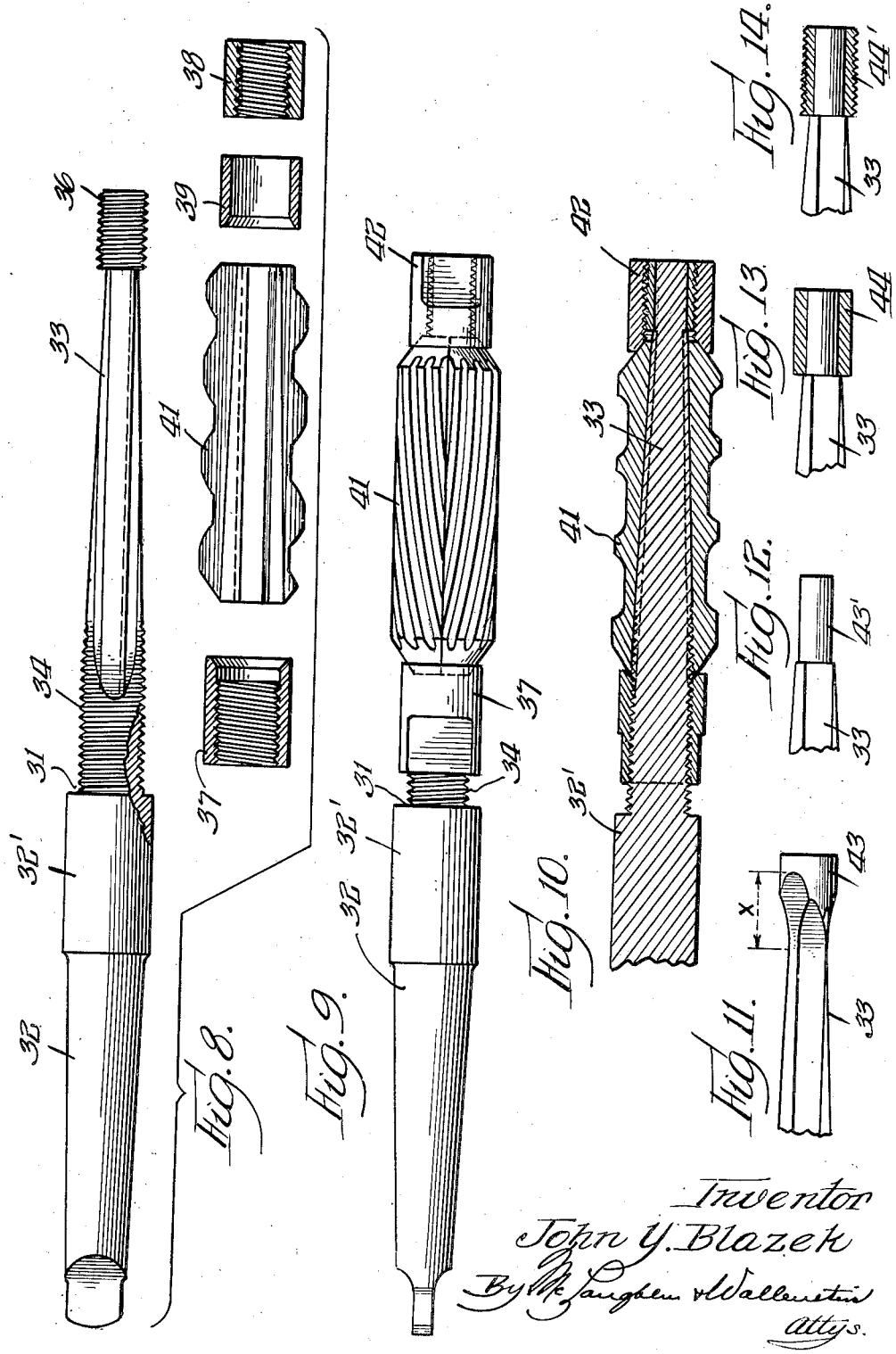
Inventor
John Y. Blazek
By McLaughlin & Wallenstein
Attys.

Patented Jan. 15, 1952

2,582,524

UNITED STATES PATENT OFFICE 2,582,524

REAMER AND METHOD OF PRODUCING SAME

John Y. Blazek, Bedford, Ohio, assignor to Lempco Products, Inc., Bedford, Ohio, a corporation of Ohio Application December 15, 1945, Serial No. 635,203

2 Claims. (Cl. 77—75.5)

My invention relates in general to reamers. It relates more in particular to an expansion reamer of the type disclosed in Evans Patents Nos. 1,902,062 and 1,989,476, and also in the copending Evans application, Serial No. 497,035, filed August 2, 1943, now Patent Number 2,421,490, dated June 3, 1947.

The Evans reamer, while representing a distinct advance in the art, has been used primarily in repair operations, such as in the refinishing of pistons for the insertion of oversize wrist pins. In adapting the Evans principles to machine shop and manufacturing operations, certain difficulties have been encountered which it is the purpose of my invention to remedy.

In the Evans reamer, as disclosed in the patents and application referred to, the portion of the reamer shank which is milled to support the blades is provided with a shoulder having a diameter greater than that of the surfaces on either side of the milled portion. In the production of the Evans reamer, this shoulder formed a reference point from which the milling operations were carried out. Commercially, these milling operations comprised using a special milling cutter which would produce a milled surface of the proper shape and mill the stock at three equally spaced circumferentially disposed points, each comprising one hundred twenty degrees of the circumference, and in each instance with the mill tapering in two directions so that on shifting the blades, they would move bodily away from the center of the shank and slightly circumferentially around the shank. Further finishing of the Evans reamer, however, required several operations which had to be performed from opposite ends of the shank because of the existence of this shoulder. It was necessary that the surfaces on opposite sides of the milled portion which carried the blade retaining sleeves be separately ground and that each set of threads be separately formed. All of these parts had to be concentric and the drive nut, threaded to one end of the reamer shank, also was required to be made in a careful manner to maintain concentricity throughout and avoid wobble. The manner of producing the reamer also required that the drive portion of the shank, that is to say, the end which is chucked, had to be formed separate from the shank and applied thereto by a threading operation. No readily available method of manufacture would permit utilizing an integral drive shank. The formation of the shoulder also made it necessary to assemble the reamer from opposite ends thereof and rendered difficult and expensive—at times substantially impossible—the production of certain forms of reamers for certain types of commercial operations.

In carrying out my invention, I select bar stock having the maximum diameter required for the drive shank and preliminarily machine it to approximately the diameter required at opposite ends of the milled portion. In this operation, the drive portion of the shank is untouched, but, at a suitable time in the operation, depending upon the exact construction of the reamer, the drive portion of the shank is finished to the size and shape desired. I then measure from the driving end of the reamer, forwardly on the shank, to the spot where it is desired that the milled portion should begin in the particular style of reamer being produced. This may leave a long or relatively short shank between the driving end of the reamer and the beginning of the milled portion, depending upon the design of the reamer and the functions which it is to perform. The spot to which a measurement point is made in the manner referred to corresponds generally to the shoulder portion of the Evans reamer and is the reference point from which the milling operations proceed. This is established, in other words, by measurement and comprises a point which can be fixed in no way except by measurement, and, unlike the case in the Evans reamer, a point which can be re-located only by using the same measurement to determine it. In other words, in the case of the Evans shoulder, the reference point from which the machining operations take place can be established by the position of the shoulder itself; while in the case of my operations this point can be established for successive milling operations only by again measuring the identical distance. The result of this manner of procedure is that the milling can take place exactly as in the previous method, but a reamer shank is produced in which there is no shoulder, and in which the diameters at the two ends of the milled portion are in each instance bigger than any part of the milled portion, unless in the case of a modified design, as will be described. The two surfaces at opposite sides of the milled portion may then be ground at the same time to the exact finish required and such threads as must be applied and such other machining operations as may be required can all take place from one end. In one form of the reamer, particularly adapted for machine tool use, a reduced diameter section is formed at the smallest part of the milled portion and a sleeve is brazed to this reduced diameter section and subsequently machined and threaded to form a retaining nut portion closer to the milled portion than is otherwise possible. This form of reamer preferably has the enlarged diameter head and has the same feature of being formed from one end and assembled from one end as other reamers produced in accordance with the present invention. In its preferred form, the sleeve is somewhat smaller in diameter than a threaded portion at the larger diameter part of the milled portion. In any case, the portion of the shank receiving the retaining nut at the large diameter part of the milled portion is no smaller than the threaded sleeve portion so that it is always possible in the manufacture to run the reamer through a conventional threading tool and form the threaded sections, whether one or two in number, entirely from one end of the shank.

Additional features and objects of the invention will be made clear by reference to the drawings and the detailed description thereof which follows.

In the drawings—

Fig. 1 is an elevational view showing one form of completed reamer which may be produced in accordance with my invention;

Fig. 2 is a longitudinal sectional view thereof;

Fig. 3 is an exploded view showing the parts (one segment only) removed from the shank, the reamer being shown in elevation, and some of the parts being shown in section;

Fig. 4 is a sectional view taken on the line 4—4 of Fig. 2 and looking in that direction in which a shoulder would normally be seen in a reamer of this type;

Figs. 5, 6 and 7 are sectional views taken on the lines 5—5, 6—6 and 7—7, respectively, of Fig. 2;

Fig. 8 is a fragmentary exploded view showing a modified form of reamer construction, the parts being removed and shown in section and the reamer shank being shown partly in elevation and partly in section;

Fig. 9 is an elevational view showing a reamer like that in Fig. 8 but slightly modified in the segment supporting mechanism employed;

Fig. 10 is a fragmentary longitudinal sectional view taken through the reamer of Fig. 9; and Figs. 11-14, inclusive, show successive operations in forming the reamer shank employed in the two proceeding embodiments.

Referring now first to Figs. 1-7, inclusive, the reamer of my invention comprises a shank 16 with an integral driving head 17 comprising the maximum diameter of the shank, a milled portion 18 supporting segments 19, segment supporting sleeves 21 and 22, a retaining spring 23 and a retaining nut 24. As shown particularly in Figs. 5 and 6, the milled portion has three segment supporting parts equally spaced from each other circumferentially and each provided with a hook-like arrangement for driving the segments as the shank is rotated.

In this form of reamer, it will be noted that the diameter of the shank where Figs. 4 and 7 are taken is the same, the former being taken at and looking in the direction in which the shoulder forming one end portion of the mill would ordinarily appear. At opposite ends of the milled portion are the sleeve receiving portions 26 and 27, both of these portions being of circular cross section and both greater in diameter than any part of the milled portion. Spring 23 is of sufficient strength so that when it is partially compressed by tightening up nut 24, it will retain the segments 19, and, therefore, to vary the cutting diameter it is necessary only to adjust the position of the nut 24. Those skilled in the art will understand that this is a very convenient arrangement but one not capable of being used under all circumstances.

In producing a reamer of this type, suitable bar stock is selected and the shank is preliminarily formed with the driving head 17 and the circular portions 26 and 27 finished approximately to the proper diameter. Measuring from the extreme rear end of the driving head 17 a distance to where the milled portion is to start, the three parts of the milled portion are successively produced in the general manner described hereinabove. The threaded portion 28 is then formed and the portions 26 and 27 ground at the same time, in whatever order of operation suits the convenience of the producer. In practice I have had good results by finish grinding the portions 26 and 27 before milling, and then threading, but, if desired, the shank may be threaded also before the milling operation. In any case, it will be noted that it is only necessary to work from one end of the reamer, it being possible to hold the work at the driving head 17 during all operations even though, for support purposes, it may be advisable to support the reamer in part from both ends during the milling or grinding operation. In any event, it is not necessary to separately grind the portions 26 and 27 nor to reverse the work for the purpose of threading when more than one thread is used. Very important, also, is the fact that the driving head 17 may remain integral with remaining portions of the shank and may be finished in any suitable shape to accommodate any conventional type of gripping or chuck device.

In assembling the reamer shown in Figs. 1-7, inclusive, after the parts have been finished, the spring is first placed over the narrow end of the reamer followed by the sleeve 21, then the sleeve 22 and finally the retaining nut 24. The latter is left loose until the segments 19 are placed in position, and when the sleeves are loosely held over the bevelled ends of the segments 19 the nut 24 is tightened to the desired point.

The manner of producing the reamers shown in Figs. 8-14, inclusive, is substantially identical in principle with that for producing the previously described reamer and the manner of assembling and using the same follows the same novel principles. The principal difference is in the use of two retaining nuts in place of a sleeve and one retaining nut and in the added feature of a sleeve structure which makes possible placing the segments closer to the end of the shank.

Looking now to Fig. 8, this comprises a shank 31 having an integral head 32 for insertion in a chuck, a milled portion 33 for receiving the cutting segments and circular threaded portions 34 and 36 at opposite ends of the milled portion. The manner of producing the milled portion is identical with that previously described and all operations take place from the forward end of the reamer. Assembled, this reamer employs retaining nuts 37 and 38, a collar 39 in advance of the retaining nut 38 and a plurality of segments 41.

The reamer of Fig. 9 is identical with that shown in Fig. 8 with the exception that only a single combination collar and nut 42 is employed in place of the collar 39 and nut 38. For convenience, and to simplify the description, the reamer of Fig. 9 bears the same reference characters as the reamer shown in Fig. 8.

The front threaded portion 36 is preferably formed by preliminarily forming a reduced diameter section, brazing a sleeve thereon and then finishing and threading the sleeve. When an attempt is made to bring the blades as near to the forward end of the reamer as possible, threads applied directly to the reamer shank would be too small to withstand the stresses and strains of the reaming process. It is not sufficient merely to thread a portion of the reamer shank of relatively larger diameter, because in the milling operation, there is necessarily a portion at the small end of the mill in the form of a shoulder having the same curvature as the exterior of the milling cutter. This portion is identified by the line X in Fig. 11. In order to form the reamer of Figs. 8 and 10, however, and place the reaming segments near the end of the reamer, I perform a series of operations as indicated in Figs. 11–14, inclusive. Here the milled portion 33 has been formed and there is a portion 43 corresponding generally to the portion 27 in the reamer shown in Fig. 2. This portion 43 will have the same diameter as the threaded portion 34 before the threads have been applied thereto. The portion 43 is then turned down to produce the narrow portion 43' (Fig. 12) which is smaller in cross section than the smallest part of the milled portion. A sleeve 44 is then brazed to the portion 43', using any suitable brazing material such as silver solder, which will melt at a sufficiently low temperature that the shank will not be deleteriously affected, and still have sufficient strength to retain the sleeve on cooling. The sleeve 44 is then turned down to the proper size as indicated at 44' in Fig. 14 and is subsequently threaded to produce the finished results as shown in the previous figures.

Some of the features and advantages of the form of the invention shown in Figs. 8 to 14, inclusive, will be understood by a study of these figures and a comparison thereof with Figs. 1 to 7, inclusive, showing the first described embodiment. Use of the retaining nut 37 instead of the spring 23 and sleeve 21 permits lengthening the pilot to include the portion 32', and shorten the space between the pilot and cutting segments. This arrangement is important for line reaming operations as it provides for greater strength and assists materially in piloting the reamer and the work. It is difficult, if not practically impossible, to make the outside diameter of sleeve 21 dead concentric with the reamer axis, whereas the portion 32' can be made dead concentric without extensive or expensive machine operations. So far as the end 36 is concerned, it should be noted that the reamer segments are brought closer to the end of the shank by the length of the dotted line X.

Those skilled in the art will understand that my reamer may take various forms while still utilizing the principles described hereinabove. There are many advantages other than those particularly pointed out, among them being greatly decreased cost of production, extreme simplicity in obtaining coinciding concentricities in essential parts and the ability to adapt the reamer to many types of uses, including so-called shell reamers, of greatly increased diameter.

The novel features of my invention are defined in the claims.

What I claim as new and desire to protect by Letters Patent of the United States is:

1. The method of producing a reamer shank having a milled segment supporting portion, which comprises measuring from an end of a reamer shank to an imaginary beginning point of the milled portion, milling the shank to produce a tapered segment supporting surface, partially rotating the shank, again measuring from the end of the reamer to said imaginary beginning point and again milling the shank, and thereby successively milling sections of said milled portion all from the same point on the shank without reference to a tangible beginning point, machining said shank to form a reduced diameter portion at the smallest diameter end of the milled portion, brazing a sleeve on said reduced diameter portion, and threading said sleeve to receive a segment supporting nut.

2. A reamer comprising a one piece shank having an enlarged driving head at one end of the shank and a tapered milled portion including a plurality of tapered segment supporting surfaces having hook-like projections, the larger end of the tapered milled portion merging with a larger diameter portion of the shank adjacent the enlarged head, the other end of the shank having a reduced diameter portion and being machined to a less diameter than the smaller end of the tapered portion and terminating the smaller end of the tapered portion, a sleeve brazed on the reduced diameter machined portion of the shank and provided with threads, a collar slidable over the sleeve and the tapered milled portion onto the larger diameter portion of the shank, means for adjustably retaining the collar on the larger diameter portion of the shank, a plurality of segments having spiralled cutting edges removably and longitudinally adjustably carried on the tapered milled portion of the shank, and a nut carried by the threaded sleeve, the collar and nut longitudinally adjustably securing the segments to the tapered portion of the shank.

JOHN Y. BLAZEK.

REFERENCES CITED

The following references are of record in the file of this patent:

UNITED STATES PATENTS

| Number | Name | Date |
| --- | --- | --- |
| 1,266,538 | Alexander | May 14, 1918 |
| 1,528,558 | Martell | Mar. 3, 1925 |
| 1,600,770 | Metzger | Sept. 21, 1926 |
| 1,614,627 | Peterson | Jan. 18, 1927 |
| 1,798,314 | Dillard | Mar. 31, 1931 |
| 1,902,062 | Evans | Mar. 21, 1933 |
| 1,908,887 | Breeler et al. | May 16, 1933 |
| 2,361,379 | Broga | Oct. 31, 1944 |
| 2,421,490 | Evans | June 3, 1947 |